(12) United States Patent
Morishima et al.

(10) Patent No.: US 7,157,174 B2
(45) Date of Patent: Jan. 2, 2007

(54) FUEL CELL SYSTEM WITH IMPROVED STARTABILITY

(75) Inventors: Shingo Morishima, Toyota (JP);
 Hidehiko Hiramatsu, Kariya (JP)

(73) Assignee: Denso Corporation, Kariya (JP)

(\*) Notice: Subject to any disclaimer, the term of this patent is extended or adjusted under 35 U.S.C. 154(b) by 534 days.

(21) Appl. No.: 10/718,629

(22) Filed: Nov. 24, 2003

(65) Prior Publication Data

US 2004/0101734 A1    May 27, 2004

(30) Foreign Application Priority Data

Nov. 26, 2002 (JP) ............................. 2002-342234

(51) Int. Cl.
 *H01M 2/14* (2006.01)
(52) U.S. Cl. ........................... 429/39; 429/34; 429/12; 429/13

(58) Field of Classification Search ................. 429/39, 429/34, 12, 13
See application file for complete search history.

(56) References Cited

FOREIGN PATENT DOCUMENTS

| JP | A 07-29587 | 1/1995 |
|----|------------|--------|
| JP | A 08-124588 | 5/1996 |
| JP | A 08-329967 | 12/1996 |
| JP | A 2001-266922 | 9/2001 |

*Primary Examiner*—Patrick Joseph Ryan
*Assistant Examiner*—Jane Rhee
(74) *Attorney, Agent, or Firm*—Oliff & Berridge, PLC (57) ABSTRACT

A fuel cell system is provided which includes a fluid pump such as an ejector pump. The fluid pump is designed to be driven by energy of air flowing within an air line through which air is supplied to a fuel cell. The fluid pump works to suck a fluid containing drops of water and residual gasses from the hydrogen line, thereby ensuring desired startability and stability of operation of the fuel cell.

11 Claims, 8 Drawing Sheets

FUEL CELL SYSTEM WITH IMPROVED STARTABILITY

BACKGROUND OF THE INVENTION

1 Technical Field of the Invention

The present invention relates generally to a fuel cell system equipped with a fuel cell working to produce an electric energy arising from chemical reaction of hydrogen with oxygen which may be employed in mobile objects such as automotive vehicles, ships or portable generator, and more particularly to an improved structure of such a fuel cell system designed to ensure desired startability.

2 Background Art

In order to improve a utility factor of fuel and power generation efficiency of fuel cells, off-gas recirculation systems are known which work to suck the off-gas emitted from hydrogen electrodes of the fuel cells using a pump and mix it with fuel supplied to the fuel cells. The pump used to recirculate the off-gas is usually implemented by an ejector pump because it can be actuated by fluid energy of the fuel and is of great advantage to power saving. For instance, Japanese Patent No. 2001-266922 teaches such a system.

Fluid-driven pumps such as ejector pumps, however, have the problem in that when the amount of fuel supplied to the fuel cells is small, that is, when fluid energy required for recirculating the off-gas is low, it results in a lack of a recirculated amount of the off-gas. Particularly, when the fuel cells are at rest during idling stops of the engine, the supply of fuel to the fuel cells is stopped. It is, thus, impossible to recirculate the off-gas.

Usually, during suspension of power generation in the fuel cells, transmission of air through electrolyte films of the fuel cells causes impurities such as nitrogen or water produced by cell reaction are accumulated within an off-gas recirculation path of the system. Additionally, when the amount of the off-gas is insufficient, it is difficult to remove the impurities from the fuel cells, thus promoting accumulation of the impurities within the off-gas recirculation path. The accumulated impurities disturb reaction of the electrodes of the fuel cells, thus resulting in decreases in startability and power generation capability of the fuel cells.

SUMMARY OF THE INVENTION

It is therefore a principal object of the invention to avoid the disadvantages of the prior art.

It is another object of the invention to provide a fuel cell system designed to ensure stability of operation of a fuel cell.

If is a further object of the invention to provide a fuel cell system designed to ensure desired startability of a fuel cell even under cold environmental conditions.

According to one aspect of the invention, there is provided a fuel cell system which may be employed in electric vehicles. The fuel cell system comprises: (a) a fuel cell working to produce an electrical energy arising from chemical reaction of hydrogen with oxygen; (b) a hydrogen supply device working to supply hydrogen to the fuel cell; (c) a hydrogen line through which the hydrogen is supplied from the hydrogen supply device to the fuel cell; (d) an air supply device working to supply air to the fuel cell; (e) an air line through which the air is supplied from the air supply device to the fuel cell; and (f) a fluid pump driven by energy of the air flowing through the air line to suck a fluid in the hydrogen line.

The above structure is capable of sucking the fluid containing impurities such as nitrogen or water from the hydrogen line even when the amount of hydrogen supplied to the fuel cell is small or the supply of the hydrogen to the fuel cell is stopped, thus ensuring the stability of operation of the fuel cell.

The fluid in the hydrogen line may be sucked through an oxygen electrode of the fuel cell. In this case, moisture contained in the fluid humidifies an electrolyte film of the fuel cell. Additionally, the hydrogen contained in the fluid undergoes catalytic combustion to produce harmless water and heat which humidifies and warms up the electrolyte film, thereby improving the startability of the fuel cell.

If the fuel cell stack is placed in cold environmental conditions, it may cause the water in the hydrogen line to freeze, thus resulting in blockage of the hydrogen or air line or the electrolyte film to freeze. This problem is, however, avoided by sucking the fluid from the hydrogen line to remove the water after stop of supply of the hydrogen to the fuel cell, thus ensuring desired startability of the fuel cell in the cold environmental conditions.

Use of mechanical pump to circulate the off-gas assures a circulated amount of the off-gas sufficient to purge the hydrogen line of the fluid even when a small amount of hydrogen is supplied to the fuel cell, but however, the freezing of water in cold environmental conditions may result in malfunction of the pump. The fuel cell system uses the fluid pump powered by the energy of air flow, thus eliminating such a problem.

In the preferred mode of the invention, the air line includes an air supply line through which the air is supplied from the air supply device to the fuel cell and an air drain line through which the air emitted from the fuel cell is discharged outside the fuel cell system. The fluid pump is driven by the energy of the air flowing through the air drain line.

The fluid pump may be implemented by an ejector pump. The air line includes an air supply line through which the air is supplied from the air supply device to the fuel cell and an air drain line through which the air emitted from the fuel cell is discharged outside the fuel cell system, the air supply line having two branches. The ejector pump is installed in one of the two branches.

The hydrogen line may include a suction line connecting to a suction port of the ejector pump.

The fuel cell system may further comprise a suction line on-off valve installed in the suction line which works to open and close the suction line selectively.

The fuel cell system may further comprise a three-way directional control valve installed in a junction of the branches of the air supply line which works to establish a flow of the air outputted from the air supply device to a selected one of the branches of the air supply line.

The fluid in the hydrogen line may be drained outside the fuel cell system through the suction line and the air drain line.

The air drain line may have two branches. The ejector pump may be installed in one of the two branches.

The three-way directional control valve may be installed in a junction of the branches of the air drain line which works to establish a flow of the air outputted from the fuel cell a selected one of the branches of the air drain line.

The fuel cell system may further comprise a vacuum tank working to store a negative pressure produced by the ejector pump and two suction line on-off valves installed in the suction line which works to open and close the suction line selectively. The vacuum tank is disposed between the suction line on-off valves.

The fuel cell system may further comprise an off-gas circulation line working to circulate an off-gas, which is emitted from the fuel cell and contains an unreacted hydrogen gas not subjected to the chemical reaction, in the hydrogen line to supply the off-gas to the fuel cell.

According to the second aspect of the invention, there is provided a fuel cell system which comprises: (a) a fuel cell working to produce an electrical energy arising from chemical reaction of hydrogen with oxygen; (b) a hydrogen supply device working to supply hydrogen to the fuel cell; (c) a hydrogen line through which the hydrogen is supplied from the hydrogen supply device to the fuel cell; (d) an air supply device working to supply air to the fuel cell; (e) an air line through which the air is supplied from the air supply device to the fuel cell; (f) a fluid pump driven by energy of a fluid flowing through one of the hydrogen line and the air line to produce a negative pressure; and (g) a vacuum tank storing therein the negative pressure produced by the fluid pump which is used to suck the fluid in the hydrogen line.

The above structure is capable of sucking the fluid containing impurities such as nitrogen or water from the hydrogen line even when the amount of hydrogen supplied to the fuel cell is small or the supply of the hydrogen to the fuel cell is stopped, thus ensuring the stability of operation of the fuel cell.

In the preferred mode of the invention, the air line may include an air supply line through which the air is supplied from the air supply device to the fuel cell and an air drain line through which the air emitted from the fuel cell is discharged outside the fuel cell system. The fluid pump is driven by the energy of the air flowing through the air drain line.

The hydrogen line may include a hydrogen supply line for supplying the hydrogen from the hydrogen supply device to the fuel cell and an off-gas circulation line for circulating an off-gas, which is emitted from the fuel cell and contains an unreacted hydrogen gas not subjected to the chemical reaction, in the hydrogen line to supply the off-gas to the fuel cell. An off-gas drain line may be provided which extends from the off-gas circulation line for draining the fluid in the hydrogen line outside the fuel cell system and two off-gas drain line on-off valves installed in the off-gas drain line to open and close the off-gas drain line selectively. The vacuum tank may be installed between the off-gas drain line on-off valves.

The fluid pump may be implemented by a circulation ejector pump which is installed in the hydrogen supply line and works to circulate the off-gas in the off-gas circulation line and to mix the off-gas with the hydrogen supplied from the hydrogen supply device to the fuel cell. The off-gas drain line and the off-gas circulation line may be so provided as to establish fluid communication with a suction port of the circulation ejector pump selectively.

The off-gas circulation line on-off valve may be installed in a portion of the off-gas circulation line located upstream of a junction of the off-gas circulation line and the off-gas drain line and works to open and close the off-gas circulation line selectively. One of the off-gas drain line on-off valves located upstream of the vacuum tank and the off-gas circulation line on-off valve may be controlled to be opened and closed selectively.

The fluid pump may be implemented by an ejector pump which is located upstream of the circulation ejector pump in the hydrogen supply line.

The hydrogen line may include a hydrogen supply line for supplying the hydrogen from the hydrogen supply device to the fuel cell and an off-gas circulation line for circulating an off-gas, which is emitted from the fuel cell and contains an unreacted hydrogen gas not subjected to the chemical reaction, in the hydrogen line to supply the off-gas to the fuel cell. The ejector pump may be installed in the hydrogen supply line which works to circulate the off-gas in the off-gas circulation line and to mix the off-gas with the hydrogen supplied from the hydrogen supply device to the fuel cell. The system may further comprise an off-gas drain line for draining the fluid in the hydrogen line outside the fuel cell system and two off-gas drain line on-off valves installed in the off-gas drain line to open and close the off-gas drain line selectively. The vacuum tank is installed between the off-gas drain line on-off valves. The circulation ejector pump has a first suction port and a second suction port. The first suction port connects with the off-gas circulation line. The second suction port connects with the off-gas drain line.

The air drain line may have two branches. The ejector pump may be installed in one of the two branches.

A three-way directional control valve may be installed in a junction of the branches of the air drain line which works to establish a flow of the air outputted from the fuel cell a selected one of the branches of the air drain line.

A vacuum tank may be provided which works to store a negative pressure produced by the ejector pump. Two suction line on-off valves may be installed in the suction line which works to open and close the suction line selectively. The vacuum tank is disposed between the suction line on-off valves.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
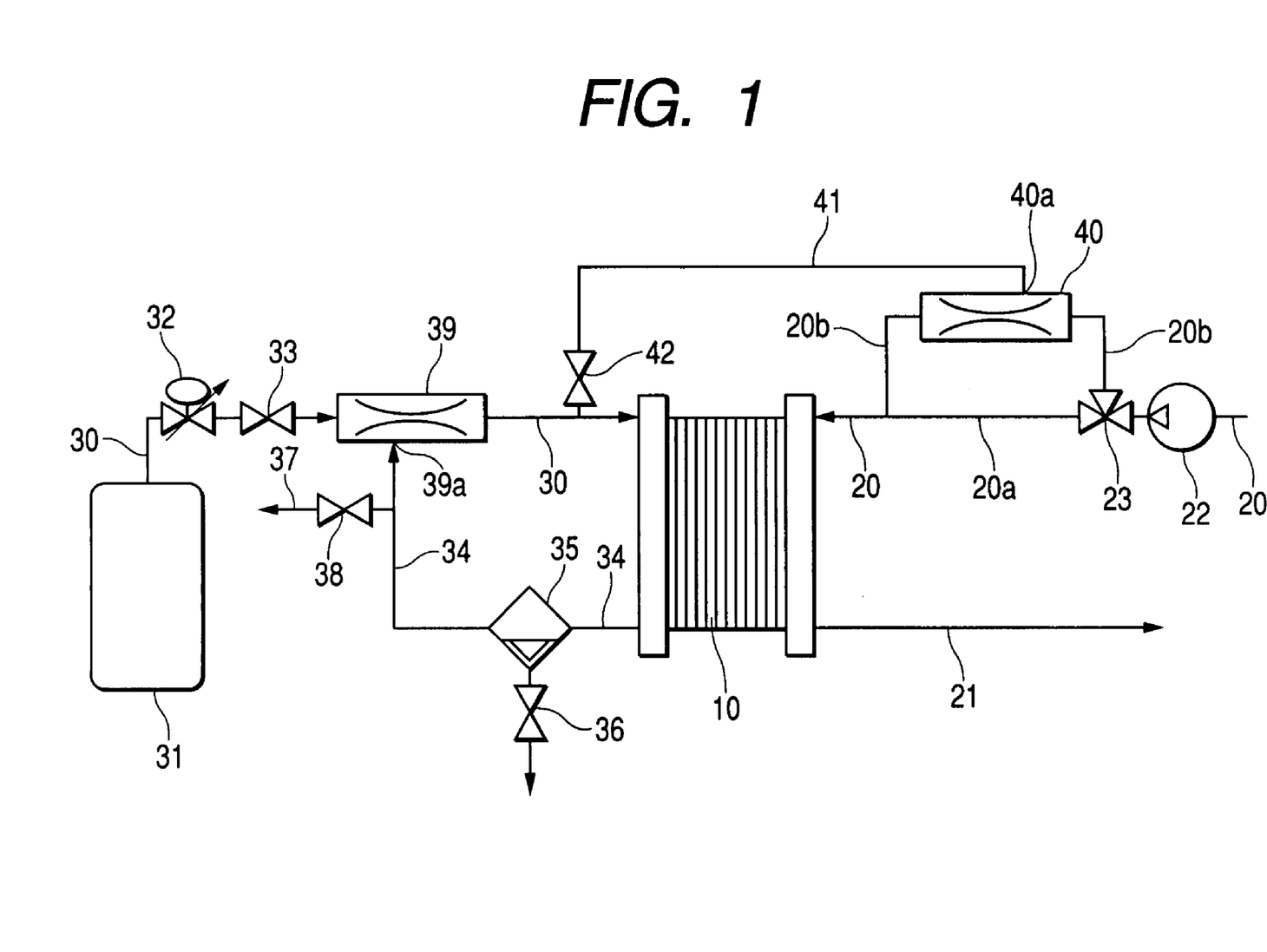
FIG. 1 is a block diagram which shows a structure of a fuel cell system according to the first embodiment of the invention.

Referring to the drawings, wherein like reference numbers refer to like parts in several views, particularly to FIG. 1, there is shown a fuel cell system according to the first embodiment of the invention. The fuel cell system is illustrated as being used as a power source to propel an electric vehicle (i.e., a vehicle cell-powered vehicle).

The fuel cell system consists essentially of a fuel cell stack 10, a hydrogen supply device 31, a circulation ejector pump 39, and an ejector pump 40.

The fuel cell stack 10, as is well known in the art, works to convert the energy produced by electrochemical reaction of oxygen and hydrogen into electric power. The fuel cell stack 10 is made up of a plurality of solid polyelectrolyte fuel cells. Each cell is made of a pair of electrodes (will also called an oxygen and a hydrogen electrode below) and an electrolyte film disposed between the electrodes. The fuel cell stack 10 is used to supply the power to electric loads such as a drive motor and a storage battery (not shown) installed in the electric vehicle. The fuel cell stack 10 is supplied with hydrogen and air (oxygen) and induces electrochemical reactions thereof at the electrodes which are of the forms:

Hydrogen electrode $H_2 \rightarrow 2H^+ + 2e^-$

Oxygen electrode $2H^+ + 1/2O_2 + 2e^- \rightarrow H_2O$

The above electrochemical reactions produce water. Additionally, humidified hydrogen and air gasses are supplied into the fuel cell stack 10 which will cause condensate water to be produced in the fuel cell stack 10.

The fuel cell system also includes an air supply line 20, and an air drain line 21. The air supply line 20 works to supply air (oxygen) to the oxygen electrodes (i.e., positive electrodes) of the fuel cell stack 10. The air drain line 21 works to discharge the air and water outside the fuel cell stack 10. The air supply device 22 is installed in the most upstream portion of the air supply line 20. The air supply device 22 is implemented by, for example, a compressor. The air supply line 20 and the air drain line 21 forms an air line, as will be referred to below.

The air supply line 20 branches out into a first air supply line 20a and a second air supply line 20b which integrate into the air supply line 20 in front of the fuel cell stack 10. In an upstream junction of the first and second air supply lines 20a and 20b, a three-way directional control valve 23 is installed which selectively establishes air communication between the air supply line 22 and the first air supply line 20a or the second air supply line 20b.

The ejector pump 40 is installed in the second air supply line 20b which is powered by energy of the air flowing through the second air supply line 20b to suck fluid in a hydrogen line, as will be described later in detail. The ejector pump 40 is implemented by, for example, a kinetic vacuum pump (e.g., JIS Z 8126 No. 2.1.1.3) which is designed to transport fluid with aid of turbulent eddy transfer of working fluid.

The fuel cell system also includes a hydrogen supply line 30 working to supply hydrogen to the hydrogen electrodes (i.e., negative electrodes) of the fuel cell stack 10. The hydrogen supply device 31 is installed in the most upstream portion of the hydrogen supply line 30. The hydrogen supply device 31 is implemented by, for example, a high-pressure hydrogen tank filled with hydrogen gas.

The hydrogen supply line 30 has disposed therein a regulator 32 working to regulate the pressure of hydrogen outputted from the hydrogen supply device 31 and an on-off valve 33 working to open or close the hydrogen supply line 30.

The fuel cell system also includes an off-gas circulation line 34 which works to mix a unreacted hydrogen containing off-gas discharged from the fuel cell stack 10 with a main flow of hydrogen supplied from the hydrogen supply device 31 and re-supply it to the fuel cell stack 10. The off-gas circulation line 34 connects between a hydrogen outlet of the fuel cell stack 10 and a downstream port of the regulator 32 in the hydrogen supply line 30. The hydrogen supply line 30 and the off-gas circulation line 34 form a hydrogen line as will be referred to below.

The off-gas circulation line 34 has disposed therein an gas liquid separator 35 which works to separate the water from the off-gas and discharge it outside the fuel cell system through a drain valve 36.

An off-gas drain line 37 branches from the off-gas circulation line 34 and works to discharge the off-gas outside the fuel cell system through an on-off drain valve 38. The on-off drain valve 38 works to open or close the off-gas drain line 37 selectively.

The circulation ejector pump 39 is installed in a junction of the hydrogen supply line 30 and the off-gas circulation line 34 and works to circulate the off-gas. The off-gas circulation line 34 leads to a suction port 39a of the off-gas ejector pump 39. The off-gas ejector pump 39 is, like the ejector pump 40, implemented by a kinetic vacuum pump which works to suck the off-gas with aid of fluid energy of the main flow of hydrogen supplied from the hydrogen supply device 31 and circulate it to the fuel cell stack 10.

A suction line 41 extends from the downstream of the circulation ejector pump 39 in the hydrogen supply line 30 to a suction port 40a of the ejector pump 40 and has disposed therein an on-off valve 42 working to open or close the suction line 41 selectively.

Operation at Start-Up of System

Prior to initiate a main operation of the fuel cell system, a system controller (not shown) actuates the three-way directional control valve 23 so as to direct the air from the air supply device 22 to the second air supply line 20b. The system controller also opens the on-off valve 42 to establish fluid communication between the hydrogen supply line 30 and the ejector pump 40 through the suction line 41 and closes the on-off valve 33 in the hydrogen supply line 30, the on-off valve 38 in the off-gas drain line 37, and the on-off valve 36 in the off-gas circulation line 34.

Subsequently, the system controller turn on the air supply device 22 to initiate supply of air to the air supply line 20. This causes the ejector pump 40 to start to suck fluid containing drops of water and gasses staying at the hydrogen electrodes of the fuel cell stack 10 through the suction line 41. The sucked fluid then passes over the oxygen electrodes of the fuel cell stack 10 and is drained outside the fuel cell system through the air drain line 21. The hydrogen contained in the sucked fluid is converted into harmless water by catalytic combustion on the oxygen electrodes.

After completion of the above operations, the controller initiates the main operation of the fuel cell system. Specifically, the controller actuates the three-way directional control valve 23 so as to establish a flow of air from the air supply device 22 to the first air supply line 20a and closes the on-off valve 42 to stop the flow of hydrogen from the hydrogen supply device 31 to the air supply line 20 through the suction line 41. Afterwards, the controller opens the on-off valve 33 to supply the hydrogen from the hydrogen supply device 31 to the fuel cell stack 10 to initiate power generation in the fuel cell stack 10.

As apparent from the above discussion, the fuel cell system works to remove impurities from the hydrogen electrodes of the fuel cell stack 10 immediately before initiation of the main operation of the fuel cell system, thereby ensuring stability of the power generation of the fuel cell stack 10 immediately after the start-up of the system.

The fluid in the hydrogen line sucked by the ejector pump 40 is, as described above, first guided to the oxygen electrodes of the fuel cell stack 10, thus causing the electrolyte films of the cells to be humidified by moisture (or drops of water) contained in the fluid. Additionally, the catalytic combustion of the hydrogen contained in the fluid on the oxygen electrodes will produce reaction heat and water which serve to warm up and humidify the cells of the fuel cell stack 10, thus improving the startability of the fuel cell stack 10.

Operation at Stop of System

The controller first closes the on-off valve 33 to stop the supply of hydrogen from the hydrogen supply device 31 to the fuel cell stack 10. If the fuel cell stack 10 is placed in cold environmental conditions which may result in freezing of water, the controller then actuate the three-way directional control valve 23 so as to supply the air from the air supply device 22 to the second air supply line 20b. The controller also opens the on-off valve 42 and closes the on-off valve 38 and the on-off valve 36.

The ejector pump 40, thus, sucks the fluid on the hydrogen electrodes of the fuel cell stack 10 through the suction line 41. The sucked fluid then passes over the oxygen electrodes and is drained outside the fuel cell system through the air drain line 21, thereby removing the water on the oxygen and hydrogen electrodes of the fuel cell stack 10. Afterwards, the controller stops the air supply device 22.

The removal of water from the oxygen and hydrogen electrodes at the stop of the fuel cell system eliminates problems encountered in the cold environmental conditions such as a failure in operation of each valve and a blockage of the hydrogen or air line due to frozen water, or freezing of the electrolyte films of the cells of the fuel cell stack 10, thus improving the startability of the fuel cell stack 10 in the cold environmental conditions.

Usually, placing the electrolyte films of the fuel cell stack 10 in moderately moist conditions is good for the startability thereof. If the fuel cell stack 10 is in conditions which may not result in freezing of water, the controller does not preferably remove the water from the oxygen and hydrogen electrodes of the fuel cell stack 10 at the stop of the fuel cell system.

Even if the amount of hydrogen supplied to the fuel cell stack 10 is small, or supply of the hydrogen is cut off, the fuel cell system of this embodiment works to suck the fluid from the hydrogen line, thus ensuring the stability of operation of the fuel cell stack 10.

Use of a mechanical pump to circulate the off-gas assures a circulated amount of the off-gas sufficient to discharge the fluid staying in the hydrogen line even when a small amount of hydrogen is supplied to the fuel cell stack 10, but however, the freezing of water in cold environmental conditions may result in malfunction of the pump. The fuel cell system of this embodiment uses the ejector pump 40 powered by the energy of air flow, thus eliminating such a problem.

Figure 2:
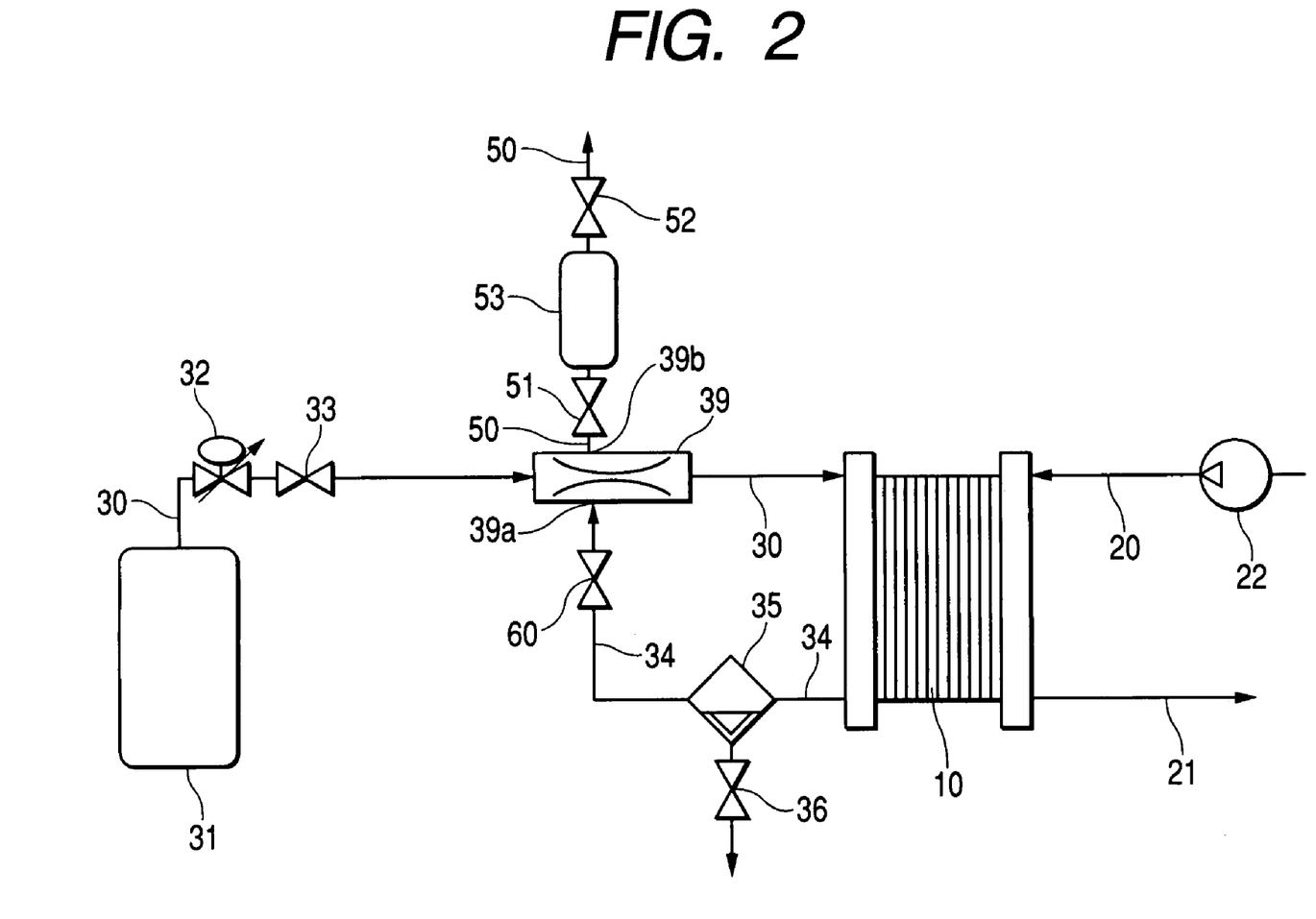
FIG. 2 is a block diagram which shows a structure of a fuel cell system according to the second embodiment of the invention.

FIG. 2 shows a fuel cell system according to the second embodiment of the invention which is different from the first embodiment in structure to suck the fluid from the hydrogen line. The same reference numbers as employed in FIG. 1 will refer to the same parts, and explanation thereof in detail will be omitted here.

The fuel cell system does not include the second air supply line 20b, the three-way directional control valve 23, the ejector pump 40, the off-gas drain line 37, the off-gas drain on-off valve 38, the suction line 41, and the suction line on-off valve 42.

The fuel cell system includes an off-gas drain line 50 which connects with a second suction port 39b of the circulation ejector pump 39 to drain the fluid in the hydrogen line outside the fuel cell system. The off-gas drain line 50 has disposed therein first and second off-gas drain line on-off valves 51 and 52 which open or close the off-gas drain line 50 selectively. A vacuum tank 53 is interposed between the valves 51 and 52. The vacuum tank 53 works to store therein a negative pressure produced by the circulation ejector pump 39. The circulation ejector pump 39 is implemented by a fluid pump.

The fuel cell system also includes an off-gas circulation line on-off valve 60 which works to open or close the off-gas circulation line 34 and pressure sensors (not shown) working to measure pressure in the vacuum tank 53 and the off-gas circulation line 34.

The fuel cell system is designed to operate in four modes as discussed below.

In the first operation mode, the first and second off-gas drain line on-off valves 51 and 52 are closed, while the off-gas circulation line on-off valve 60 is opened. In the second operation mode, the first off-gas drain line on-off valve 51 is opened, while the second off-gas drain line on-off valve 52 and the off-gas circulation line on-off valve 60 are closed. In the third operation mode, the first off-gas drain line on-off valve 51 is opened, the second off-gas drain line on-off valve 52 is closed, and the off-gas circulation line on-off valve 60 is opened. In the fourth operation mode, the first off-gas drain line on-off valve 51 is closed, while the second off-gas drain line on-off valve 52 and the off-gas circulation line on-off valve 60 are opened. The hydrogen supply line on-off valve 33 is kept opened at all times during operation of the fuel cell system.

When the pressure in the vacuum tank 53 is lower than a given negative level during operation of the fuel cell system, i.e., activation of the fuel cell stack 10, the controller (not shown) places the system in the first operation mode. The off-gas circulation line on-off valve 60 is opened to establish fluid communication between the off-gas circulation line 34 and the first suction port 39a of the circulation ejector pump 39, thereby causing the circulation ejector pump 39 to create a negative pressure to suck thereinto the off-gas through the off-gas circulation line 34. The off-gas is then circulated to the hydrogen supply line 30. The gas liquid separator 35 works to remove water from the circulating off-gas and drain it outside the off-gas circulation line 34 when the on-off valve 36 is opened.

When the pressure in the vacuum tank 53 is higher than the given negative level, the controller places the system in the second operation mode. The first off-gas drain line on-off valve 51 is opened to establish fluid communication between the vacuum tank 53 and the second suction port 39b of the circulation ejector pump 39, thus causing the vacuum tank 53 to be sucked by the negative pressure in the circulation ejector pump 39. When the pressure in the vacuum tank 53 drops below the given negative level or when it is required to stop supply of hydrogen to the fuel cell stack 10, the controller places the system in the first operation mode, thereby storing the given negative pressure in the vacuum tank 53.

When it is required to start the fuel cell system, the controller places the system in the second operation mode prior to start-up of the system, thereby sucking the fluid (containing drops of water and residual gasses) staying around the hydrogen electrodes of the fuel cell stack 10 into the vacuum tank 53 through the off-gas circulation line 34. After the pressure within the vacuum tank 53 becomes stable, the controller opens the hydrogen supply line on-off valve 33 to supply the hydrogen from the hydrogen supply device 31 to the fuel cell stack 10 to initiate the power generating operation of the fuel cell stack 10. The controller places the system in the third operation mode.

When the pressure within the off-gas circulation line 34 balances with that within the vacuum tank 53, the controller places the system in the fourth operation mode. The pressure in the off-gas circulation line 34 is higher than the atmospheric pressure, so that the pressure in the vacuum tank 53 is also higher than the atmospheric pressure. Thus, in the fourth operation mode where the second off-gas drain line on-off valve 52 is opened, the fluid within the vacuum tank 52 is discharged to the atmosphere.

After the fluid is discharged from the vacuum tank 53 to the atmosphere in the fourth operation mode, the controller shifts the system to the second operation mode and then switches it to the third operation mode to store the negative pressure within the vacuum tank 53 again.

As apparent from the above discussion, the system of this embodiment works to remove impurities from the hydrogen electrodes of the fuel cell stack 10 immediately before the fuel cell system is started, thus ensuring stability of the power generation of the fuel cell stack 10 immediately after the start-up of the system.

Even if the amount of hydrogen supplied to the fuel cell stack 10 is small, or supply of the hydrogen is cut off, the fuel cell system of this embodiment is capable of sucking the fluid from the hydrogen line, thus ensuring the stability of operation of the fuel cell stack 10.

Use of the circulation ejector pump 39 and the vacuum tank 53 which are actuated by energy of the air to suck the fluid from the hydrogen line ensures the stability of operation of the system in cold environmental conditions.

Use of the negative pressure within the vacuum tank 53 ensures quick suction of the fluid from the hydrogen line, thereby improving the startability of the fuel cell stack 10 further.

The system of this embodiment may emit the second off-gas drain line on-off valve 52 and a portion of the off-gas drain line 50 within which the second off-gas drain line on-off valve 52 is installed. In this case, emission of the fluid from the vacuum tank 53 is achieved by opening the drain valve 36, the first off-gas drain line on-off valve 51, and the off-gas circulation on-off valve 60.

Figure 3:
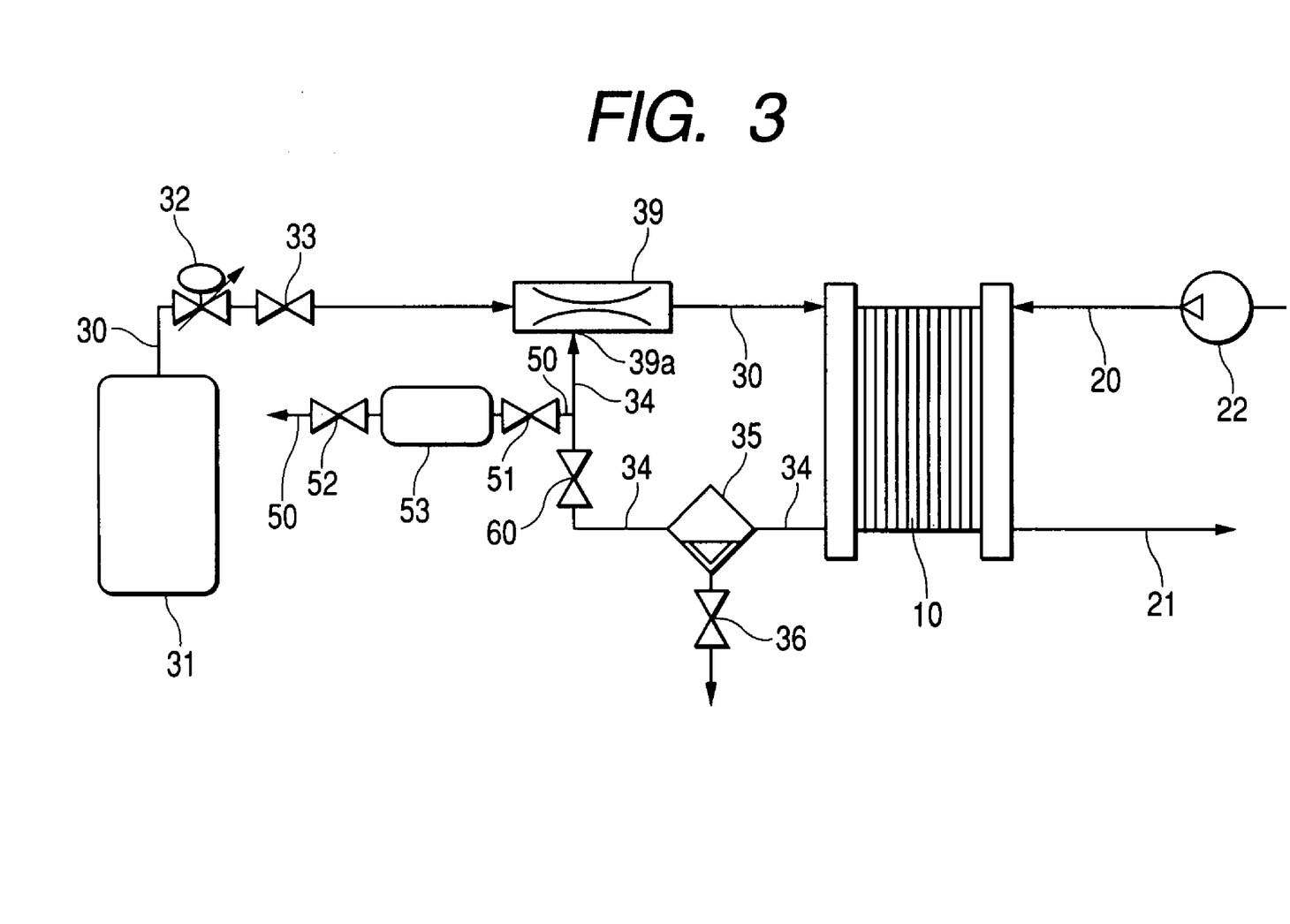
FIG. 3 is a block diagram which shows a structure of a fuel cell system according to the third embodiment of the invention.

FIG. 3 shows a fuel cell system according to the third embodiment of the invention which is different from the second embodiment in location of a junction of the off-gas drain line 50. The same reference numbers as employed in FIG. 2 will refer to the same parts, and explanation thereof in detail will be omitted here.

The off-gas drain line 50 is, as clearly shown in FIG. 3, connected to the off-gas circulation line 34 between the circulation ejector pump 39 and the off-gas circulation line on-off valve 60.

When it is required to store the negative pressure within the vacuum tank 53, the controller places the system in the second operation mode, as described in the second embodiment, to suck the pressure in the vacuum tank 53 by the negative pressure developed at the first suction port 39a of the circulation ejector pump 39.

Other operations are identical, and explanation thereof in detail will be omitted here.

The system of this embodiment may emit the second off-gas drain line on-off valve 52 and a portion of the off-gas drain line 50 within which the second off-gas drain line on-off valve 52 is installed. In this case, emission of the fluid from the vacuum tank 53 is achieved by opening the drain valve 36, the first off-gas drain line on-off valve 51, and the off-gas circulation on-off valve 60.

Figure 4:
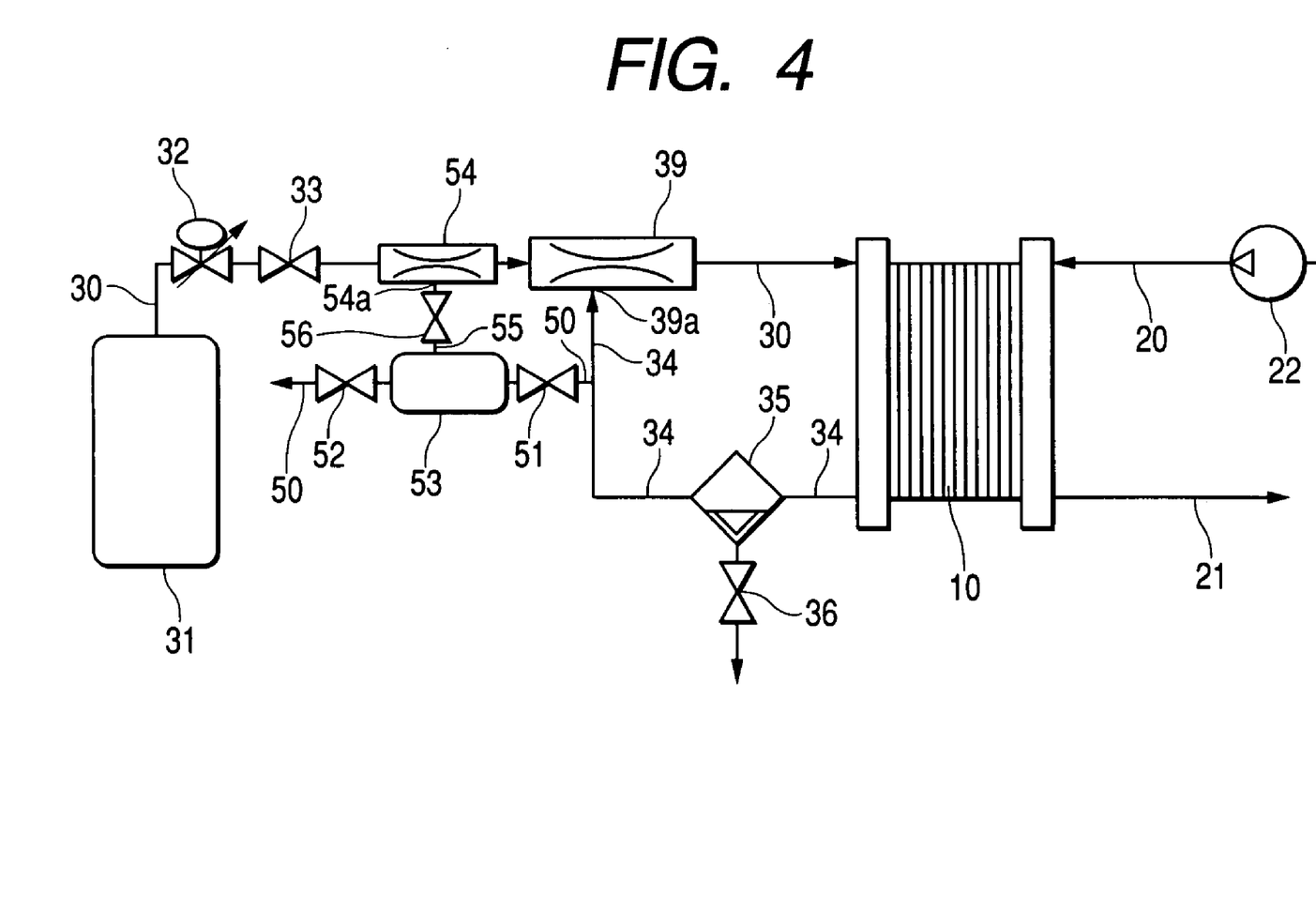
FIG. 4 is a block diagram which shows a structure of a fuel cell system according to the fourth embodiment of the invention.

FIG. 4 shows a fuel cell system according to the fourth embodiment of the invention which is different from the second embodiment in a structure to store the negative pressure within the vacuum tank 53. The same reference numbers as employed in FIG. 3 will refer to the same parts, and explanation thereof in detail will be omitted here.

A negative pressure ejector pump 54 is disposed upstream of the circulation ejector pump 39 in the hydrogen supply line 30. The ejector pump 54 is implemented by a kinetic vacuum pump designed to transport fluid with aid of turbulent eddy transfer of working fluid. Specifically, the ejector pump 54 is powered by energy of a flow of hydrogen supplied from the hydrogen supply device 31.

The ejector pump 54 is connected at a suction port 54a to the vacuum tank 53 through a negative pressure supply line 55. The negative pressure supply line 55 is opened or closed selectively by a negative pressure supply line on-off valve 56.

The fuel cell system of this embodiment omits the off-gas circulation on-off valve 60, as used in the third embodiment, and is designed to operate in four modes as discussed below.

In the first operation mode, the first and second off-gas drain line on-off valves 51 and 52 are closed, and the negative pressure supply line on-off valve 56 is closed. In the second operation mode, the first off-gas drain line on-off valve 51 is opened, while the second off-gas drain line on-off valve 52 and the negative pressure supply line on-off valve 56 are closed. In the third operation mode, the first off-gas drain line on-off valve 51 is closed, the second off-gas drain line on-off valve 52 is closed, and the negative pressure supply line on-off valve 56 is opened. In the fourth operation mode, the first off-gas drain line on-off valve 51 is closed, while the second off-gas drain line on-off valve 52 is opened, and the negative pressure supply line on-off valve 56 is closed. The hydrogen supply line on-off valve 33 is kept opened at all times during operation of the fuel cell system.

When the pressure in the vacuum tank 53 is lower than a given negative level during operation of the fuel cell system, i.e., activation of the fuel cell stack 10, the controller places the system in the first operation mode. The circulation ejector pump 39 produces a negative pressure to suck the off-gas through the off-gas circulation line 34 and circulate it to the hydrogen supply line 30. The gas liquid separator 35 works to remove water from the circulating off-gas and drain it outside the off-gas circulation line 34 when the on-off valve 36 is opened.

When the pressure in the vacuum tank 53 is higher than the given negative level, the controller places the system in the third operation mode. The negative pressure supply line on-off valve 56 is opened to establish fluid communication of the vacuum tank 53 with the suction port 54a of the negative pressure ejector pump 54, thereby causing the vacuum tank 53 to be sucked by the negative pressure produced by the negative pressure ejector pump 54. Afterwards, when the pressure in the vacuum tank 53 drops below the given negative level or when it is required to stop supply of hydrogen to the fuel cell stack 10, the controller places the system in the first operation mode, thereby storing the given negative pressure in the vacuum tank 53.

When it is required to start the fuel cell system, the controller places the system in the second operation mode and at the same time opens the hydrogen supply line on-off valve 33, thereby sucking the fluid (containing drops of water and residual gasses) staying around the hydrogen electrodes of the fuel cell stack 10 into the vacuum tank 53 through the off-gas circulation line 34. The hydrogen supply device 31 supplies the hydrogen to the fuel cell stack 10.

When the pressure within the off-gas circulation line 34 balances with that within the vacuum tank 53, the controller places the system in the fourth operation mode. The pressure in the off-gas circulation line 34 is higher than the atmospheric pressure, so that the pressure in the vacuum tank 53 is also higher than the atmospheric pressure. Thus, in the fourth operation mode where the second off-gas drain line on-off valve 52 is opened, the fluid within the vacuum tank 52 is discharged to the atmosphere.

After the fluid is discharged from the vacuum tank 53 to the atmosphere in the fourth operation mode, the controller shifts the system to the third operation mode and then switches it to the first operation mode to store the negative pressure within the vacuum tank 53 again.

As apparent from the above discussion, the system of this embodiment provides the same effects as those in the third embodiment. Typical fuel cell systems are designed to decrease the pressure of hydrogen within the hydrogen supply device 31 through the regulator 32 and supply it directly to the circulation ejector pump 39, thereby wasting a large amount of fluid energy, but however, the system of this embodiment employs such fluid energy in the negative ejector pump 54 located upstream of the circulation ejector pump 39.

The system of this embodiment may emit the second off-gas drain line on-off valve 52 and a portion of the off-gas drain line 50 within which the second off-gas drain line on-off valve 52 is installed. In this case, emission of the fluid from the vacuum tank 53 to the atmosphere is achieved by opening the drain valve 36 and the first off-gas drain line on-off valve 51.

Figure 5:
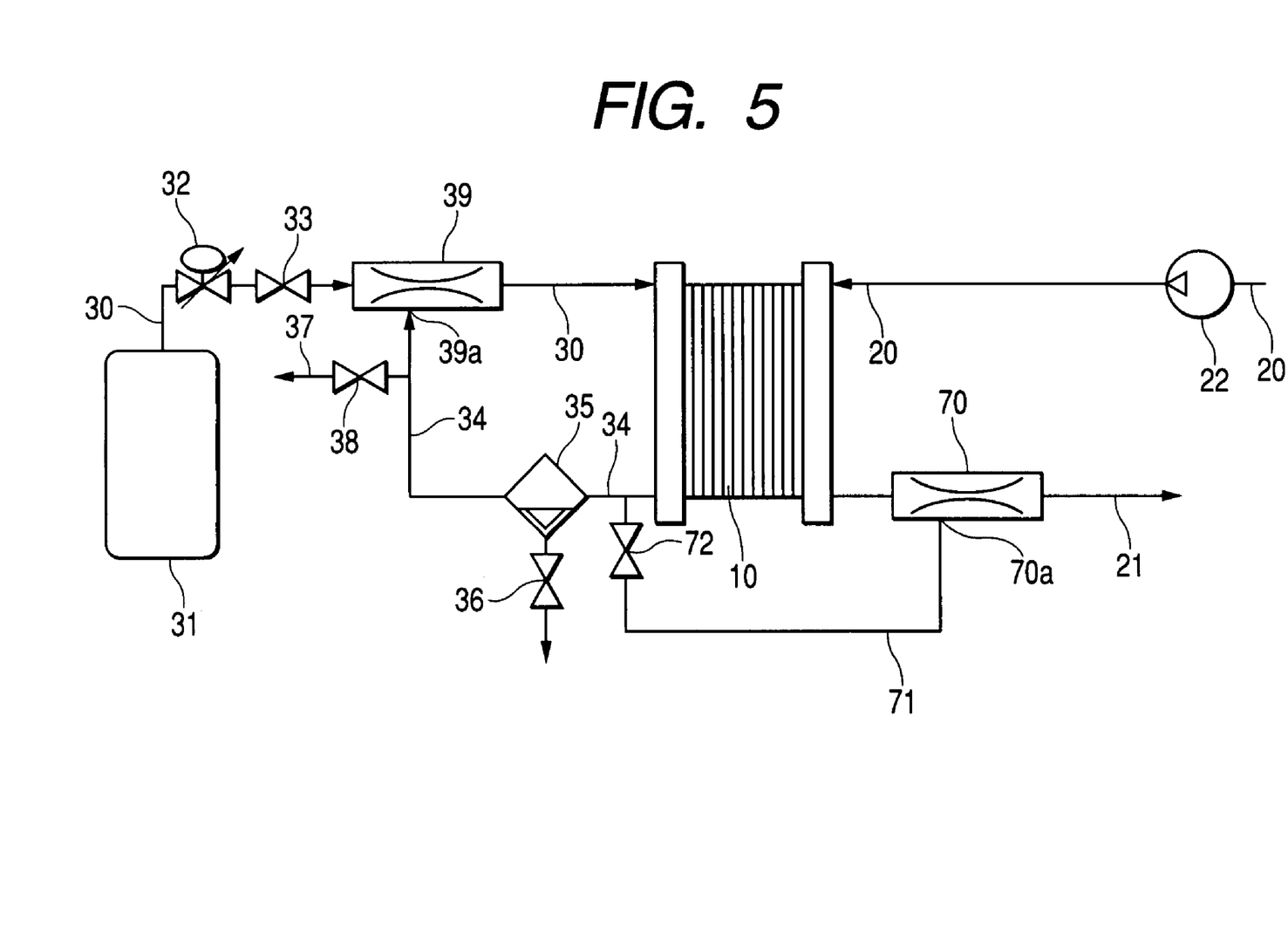
FIG. 5 is a block diagram which shows a structure of a fuel cell system according to the fifth embodiment of the invention.

FIG. 5 shows a fuel cell system according to the fifth embodiment of the invention which is different from the first embodiment in a structure to suck the fluid flowing in the hydrogen line. The same reference numbers as employed in FIG. 1 will refer to the same parts, and explanation thereof in detail will be omitted here.

The fuel cell system does not include the second air supply line 20b, the three-way directional control valve 23, the ejector pump 40, the suction line 41, and the suction line on-off valve 42.

An air ejector pump 70 is disposed in the air drain line 21 and powered by energy of the air flowing through the air drain line 21 to suck the fluid within the hydrogen line. The air ejector pump 70 is implemented by a kinetic vacuum pump designed to transport fluid with aid of turbulent eddy transfer of working fluid.

A suction line 71 branches from a portion of the off-gas circulation line 34 located upstream of the gas liquid separator 35 and connects with a suction port 70a of the air ejector pump 70. A suction line on-off valve 72 is disposed within the suction line 71 which works to open or close the suction line 71 selectively.

Prior to start-up of the fuel cell system, the controller opens the suction line on-off valve 72 to establish fluid communication between the off-gas circulation line 34 and the air ejector pump 70 through the suction line 71. The controller closes the hydrogen supply line on-off valve 33, the off-gas drain line on-off valve 38, and the drain valve 36.

Upon actuation of the air supply device 22 to initiate supply of air to the fuel cell stack 10, the air ejector pump 70 works to suck the fluid (containing drops of water and residual gasses) staying around the hydrogen electrodes of the fuel cell stack 10 through the suction line 71. The sucked fluid is then discharged outside the system through the air drain line 21. Afterwards, the controller opens the hydrogen supply line on-off valve 33 to initiate supply of hydrogen from the hydrogen supply device 31 to the fuel cell stack 10 to start the power generating operation thereof.

When the supply of hydrogen is started concurrently with actuation of the air supply device 22 upon start-up of the fuel cell system, pushing action of the hydrogen and sucking action of the ejector pumps 39 and 70 serve to remove impurities from the fuel cell stack 10 effectively. At an instant when the actuation of the fuel cell stack 10 is completed, the controller closes the suction line on-off valve 72.

The air drain line 21 (i.e., a downstream side of the oxygen electrodes) is less in oxygen than the air supply line 20 (i.e., an upstream side of the oxygen electrodes), so that there is almost no possibility that hydrogen contained in the sucked fluid will be burned with air discharged from the fuel cell stack 10.

Figure 6:
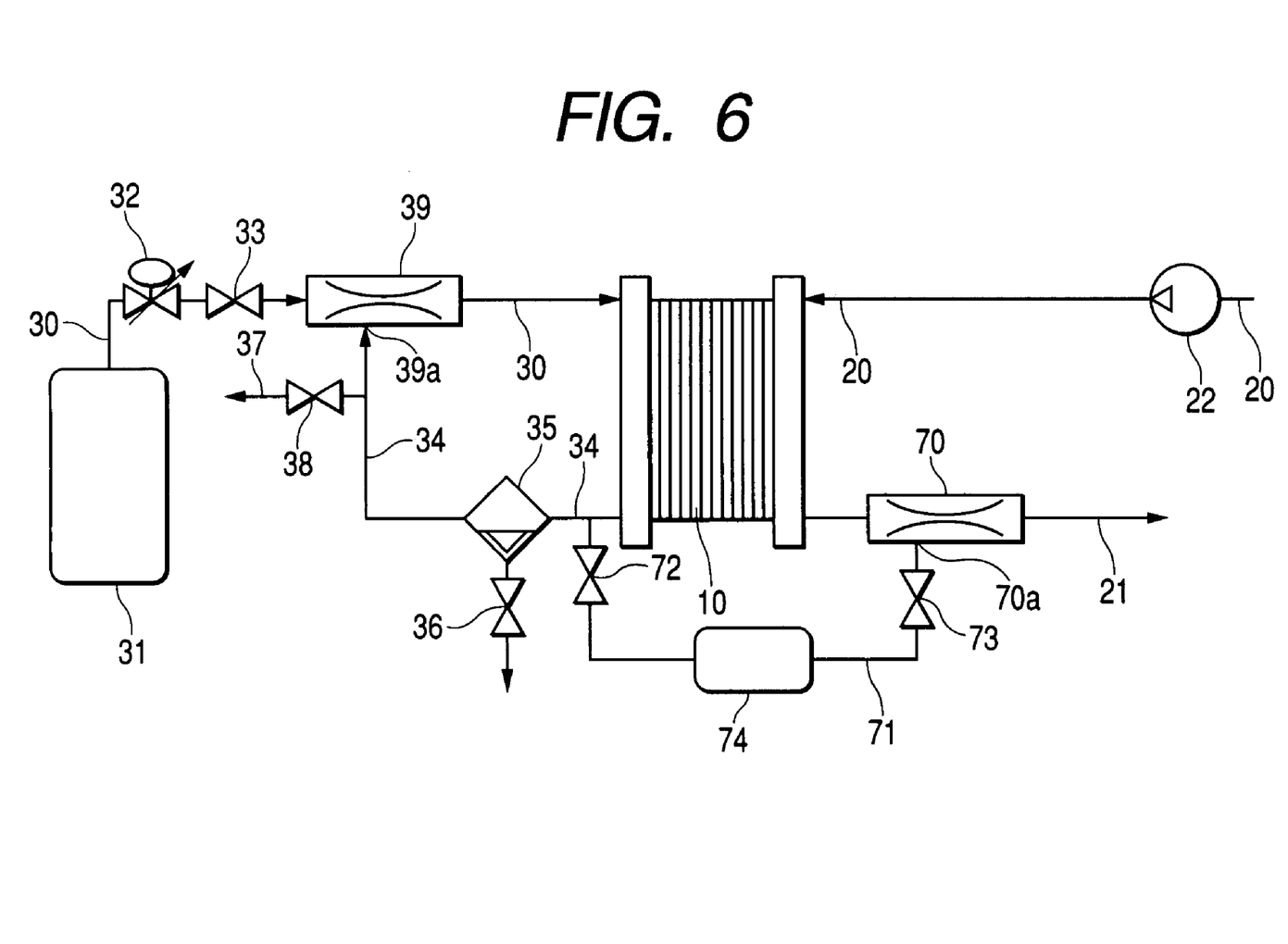
FIG. 6 is a block diagram which shows a structure of a fuel cell system according to the sixth embodiment of the invention.

FIG. 6 shows a fuel cell system according to the sixth embodiment of the invention.

The fuel cell system includes a second suction line on-off valve 73 working to open or close the suction line 71 and a vacuum tank 74 interposed between the first and second suction line on-off valves 72 and 73 in the suction line 71. Other arrangements are identical with those in the fifth embodiment, and explanation thereof in detail will be omitted here.

Storing a desired negative pressure within the vacuum tank 74 is achieved during actuation of the fuel cell stack 10 by closing the first suction line on-off valve 72 while opening the second suction line on-off valve 73 to have the air ejector pump 70 suck the vacuum tank 74 and then closing the second suction line on-off valve 73 when the pressure in the vacuum tank 74 reaches a given level. The negative pressure thus stored in the vacuum tank 74 is utilized to remove impurities from the hydrogen electrodes of the fuel cell stack 10 at the start-up of the fuel cell stack 10. The removal of impurities is accomplished by closing the second suction line on-off valve 73 and opening the first suction line on-off valve 72 to suck the fluid (containing drops of water and residual gasses) staying around the hydrogen electrodes through the off-gas circulation line 34 with aid of the negative pressure stored in the vacuum tank 74.

Afterwards, in a condition where the first suction line on-off valve 72 is opened, and the second suction line on-off valve 73 is closed, the controller starts supply of oxygen and hydrogen to the fuel cell stack 10. After the pressure within the vacuum tank 74 becomes stable, the controller closes the first suction line on-off valve 72 and opens the second suction line on-off valve 73 to suck the fluid from the vacuum tank 74 through the air ejector pump 70 and discharge it outside the fuel cell system through the air drain line 21. When the pressure in the vacuum tank 74 drops below the given negative level, the controller closes the second suction line on-off valve 73 to keep the vacuum tank 74 at the given negative level.

As apparent from the above discussion, use of the negative pressure within the vacuum tank 74 ensures quick suction of the fluid from the hydrogen line, thereby improving the startability of the fuel cell stack 10.

Figure 7:
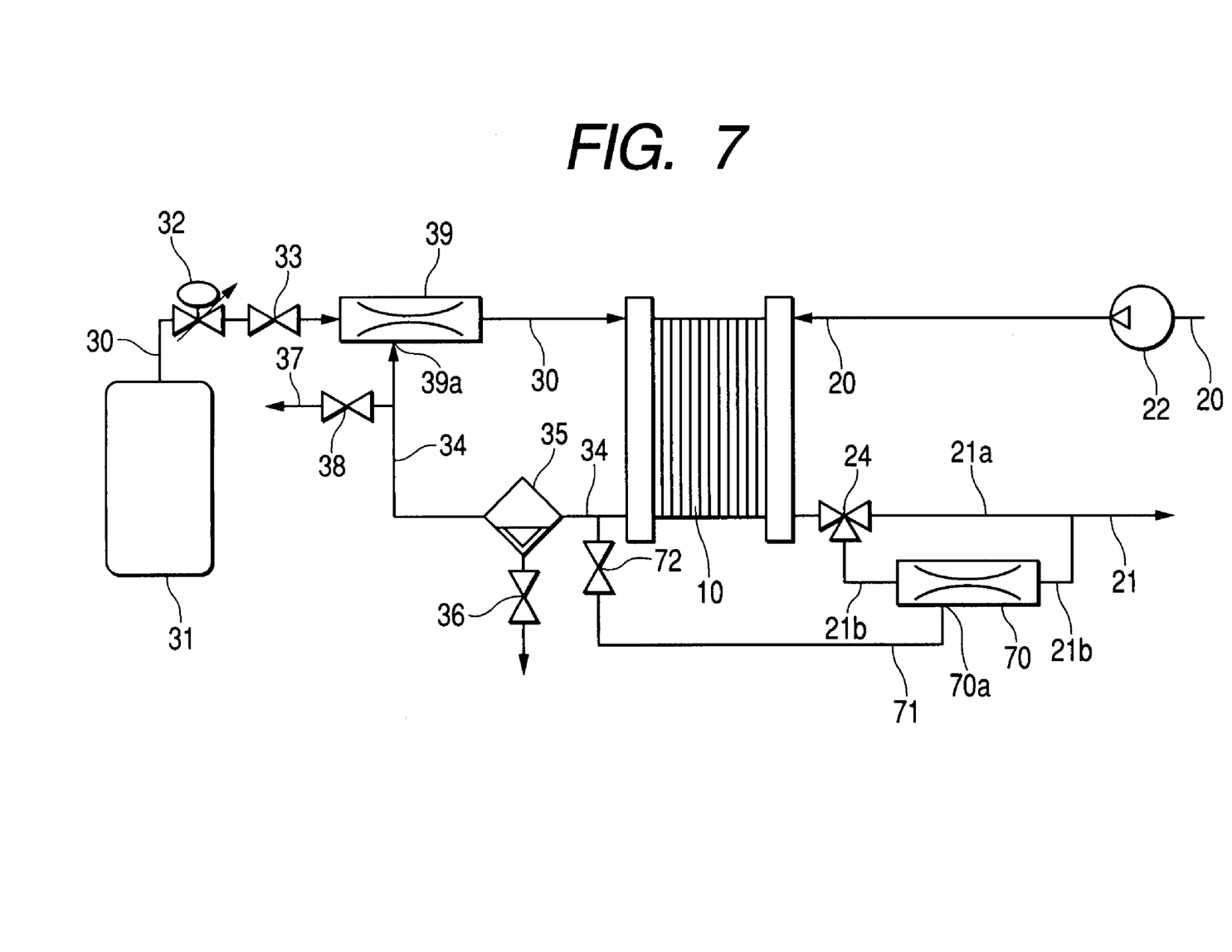
FIG. 7 is a block diagram which shows a structure of a fuel cell system according to the seventh embodiment of the invention.

FIG. 7 shows a fuel cell system according to the seventh embodiment of the invention which is different from the fifth embodiment in a structure to suck the fluid from the hydrogen line. The same reference numbers as employed in the fifth embodiment refer to the same parts, and explanation thereof in detail will be omitted here.

The air drain line 21 branches out into a first air drain line 21a and a second air drain line 21b which joint together downstream of the air drain line 21. In an upstream junction of the first and second air drain lines 21a and 21b, a three-way directional control valve 24 is installed which selectively establishes air communication between the air drain line 22 and the first air drain line 21a or the second air drain line 21b. The air ejector pump is installed in the second air drain line 21b.

When it is required to start the fuel cell stack 10, the controller actuates the three-way directional control valve 24 so as to establish fluid communication between the fuel cell stack 10 and the second air drain line 21b, opens the suction line on-off valve 72, and turns on the air supply device 22. This causes the air ejector pump 70 to suck the fluid (containing drops of water and residual gasses) staying around the hydrogen electrodes of the fuel cell stack 10 through the suction line 71 which is, in turn, discharged outside the fuel cell system from the air drain line 21.

After the start-up of the fuel cell stack 10, the controller actuates the three-way directional control valve 24 so as to establish fluid communication between the fuel cell stack 10 and the first air drain line 21a to produce a flow of air from the fuel cell stack 10 to the first air drain line 21a and closes the suction line on-off valve 72.

The system of this embodiment provides the same effects as those in the fifth embodiment. The emission of air without the air ejector pump 70 after the start-up of the fuel cell stack 10 results in a decreased emission loss. This leads to a decreased load on the air supply device 22, thus resulting in a decreased electric power consumption in the air supply device 22 if it is of an electric motor-driven type.

Figure 8:
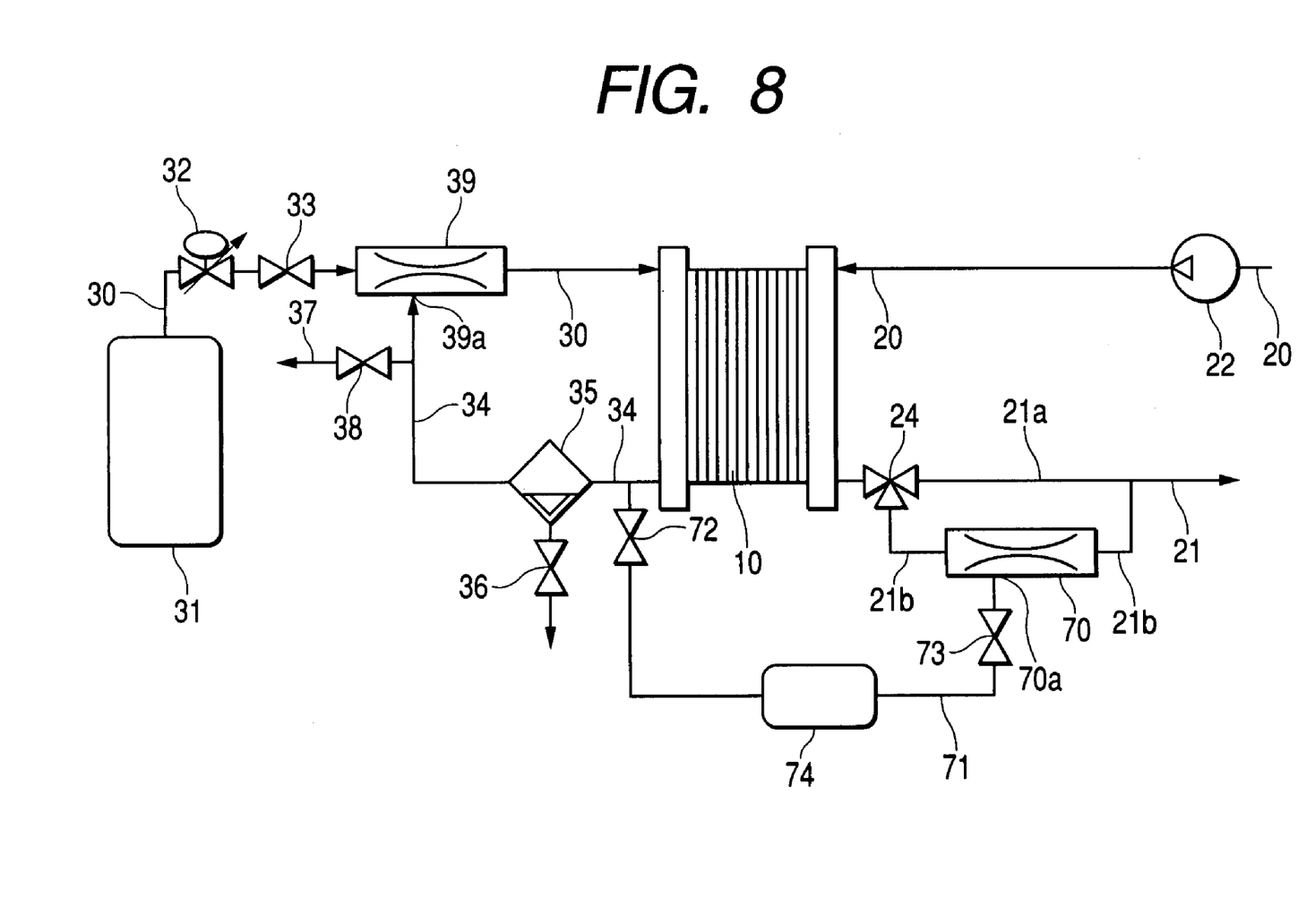
FIG. 8 is a block diagram which shows a structure of a fuel cell system according to the eighth embodiment of the invention.

FIG. 8 shows a fuel cell system according to the eighth embodiment of the invention.

The fuel cell system includes the second suction line on-off valve 73 working to open or close the suction line 71 and the vacuum tank 74 interposed between the first and second suction line on-off valves 72 and 73 in the suction line 71. Other arrangements are identical with those in the seventh embodiment, and explanation thereof in detail will be omitted here.

Storing a desired negative pressure within the vacuum tank 74 is achieved during actuation of the fuel cell stack 10 by actuating the three-way directional control valve 24 so as to produce a flow of air from the fuel cell stack 10 to the second air drain line 21b, closing the first suction line on-off valve 72 while opening the second suction line on-off valve 73 to have the air ejector pump 70 suck the vacuum tank 74 and then closing the second suction line on-off valve 73 when the pressure in the vacuum tank 74 reaches a given level.

The negative pressure thus stored in the vacuum tank 74 is utilized to remove impurities from the hydrogen electrodes of the fuel cell stack 10. The removal of impurities is accomplished by closing the second suction line on-off valve 73 and opening the first suction line on-off valve 72 to suck the fluid (containing drops of water and residual gasses) staying around the hydrogen electrodes through the off-gas circulation line 34 with aid of the negative pressure stored in the vacuum tank 74.

After the pressure within the vacuum tank 74 becomes stable, the controller closes the first suction line on-off valve 72 and opens the second suction line on-off valve 73 to suck the fluid from the vacuum tank 74 through the air ejector pump 70 and discharge it outside the fuel cell system through the air drain line 21.

The system of this embodiment provides the same effects as those in the seventh embodiment. Use of the negative pressure within the vacuum tank 74 ensures quick suction of the fluid from the hydrogen line, thereby improving the startability of the fuel cell stack 10.

While the present invention has been disclosed in terms of the preferred embodiments in order to facilitate better understanding thereof, it should be appreciated that the invention can be-embodied in various ways without departing from the principle of the invention. Therefore, the invention should be understood to include all possible embodiments and modifications to the shown embodiments witch can be embodied without departing from the principle of the invention as set forth in the appended claims.

The above described fuel cell system of each embodiment is of a circulation type in which the off-gas emitted from the fuel cell stack 10 is circulated to the fuel cell stack 10, but however, the invention may alternatively be used with a closed type of fuel cell system in which the off-gas is not circulated.

In a case where the fuel cell system is mounted in automobiles, the negative pressure in the ejector pump may be employed in a brake system. Specifically, vehicles equipped with an electric motor used to propel the vehicle and a vacuum brake booster usually use an electric pump to supply a negative pressure to the brake booster. Use of the ejector pump to supply the negative pressure to the brake booster eliminates the need for the electric pump, thus resulting in simplified structure of the brake system and decreasing a fuel consumption of the vehicle.

What is claimed is:

1. A fuel cell system comprising:
   a fuel cell working to produce an electrical energy arising from chemical reaction of hydrogen with oxygen;
   a hydrogen supply device working to supply hydrogen to said fuel cell;
   a hydrogen line through which the hydrogen is supplied from said hydrogen supply device to said fuel cell;
   an air supply device working to supply air to said fuel cell;
   an air line through which the air is supplied from said air supply device to said fuel cell; and
   a fluid pump driven by energy of the air flowing through said air line to suck a fluid in said hydrogen line.

2. A fuel cell system as set forth in claim 1, wherein said air line includes an air supply line through which the air is supplied from said air supply device to said fuel cell and an air drain line through which the air emitted from said fuel cell is discharged outside the fuel cell system, and wherein said fluid pump is driven by the energy of the air flowing through the air drain line.

3. A fuel cell system as set forth in claim 1, wherein said fluid pump is implemented by an ejector pump, wherein said air line includes an air supply line through which the air is supplied from said air supply device to said fuel cell and an air drain line through which the air emitted from said fuel cell is discharged outside the fuel cell system, the air supply line having two branches, and wherein said ejector pump is installed in one of the two branches.

4. A fuel cell system as set forth in claim 3, wherein said hydrogen line includes a suction line connecting to a suction port of said ejector pump.

5. A fuel cell system as set forth in claim 4, further comprising a suction line on-off valve installed in the suction line which works to open and close the suction line selectively.

6. A fuel cell system as set forth in claim 3, further comprising a three-way directional control valve installed in a junction of the branches of said air supply line which works to establish a flow of the air outputted from said air supply device to a selected one of the branches of the air supply line.

7. A fuel cell system as set forth in claim 2, wherein said fluid pump is implemented by an ejector pump, further comprising a suction line extending from said hydrogen line to a suction port of said ejector pump, and wherein the fluid in said hydrogen line is drained outside the fuel cell system through said suction line and said air drain line.

8. A fuel cell system as set forth in claim 7, wherein said air drain line has two branches, and wherein said ejector pump is installed in one of the two branches.

9. A fuel cell system as set forth in claim 8, further comprising a three-way directional control valve installed in a junction of the branches of said air drain line which works to establish a flow-of the air outputted from said fuel cell a selected one of the branches of the air drain line.

10. A fuel cell system as set forth in claim 7, further comprising a vacuum tank working to store a negative pressure produced by said ejector pump and two suction line on-off valves installed in said suction line which works to open and close said suction line selectively, and wherein said vacuum tank is disposed between the suction line on-off valves.

11. A fuel cell system as set forth in claim 1, further comprising an off-gas circulation line working to circulate an off-gas, which is emitted from said fuel cell and contains an unreacted hydrogen gas not subjected to the chemical reaction, in said hydrogen line to supply the off-gas to said fuel cell.

* * * * *